Patented Aug. 8, 1950

2,517,610

UNITED STATES PATENT OFFICE 2,517,610

POLYMERIC MATERIALS

Charles William Tullock, Wilmington, Del., assignor to E. I. du Pont de Nemours & Company, Wilmington, Del., a corporation of Delaware No Drawing. Application October 7, 1947, Serial No. 778,456

13 Claims. (Cl. 260—32.8)

This invention relates to synthetic linear copolyamides, and more particularly to new and useful fluid and plasticized compositions comprising these copolyamides.

It has been reported by Curtius, J. prakt. Chem. 125, 211–302 (1930), that the polyamides from the N-carboanhydrides of leucine and valine are soluble in benzene and that the polyamide from the N-carboanhydride of alpha-amino-isoamyl-acetic acid is soluble in hot benzene. Curtius further reports the solubility of the polyamide from the N-carboanhydride of m-tolylalanine in hot ethyl acetate and hot acetone; in both cases the polymer precipitates upon cooling. Curtius also reports the solubility of the polyamide from the N-carboanhydride of leucine in warm acetic acid and of the polyamide from the N-carboanhydride of valine in warm concentrated hydrochloric acid. Wessely and Sigmund, Z. physiol. chem. 159, 102–119 (1926), report the solubility of the polyamide from the N-carboanhydride of sarcosine (N-methylglycine) in water, ethanol, and with great difficulty in chloroform, phenol, and acetic acid. Woodward and Schramm, J. Am. Chem. Soc. 69, 1551 (1947) report that benzene is a solvent for the copolyamide from the N-carboanhydrides of DL-beta-phenylalanine and l-leucine, giving extremely viscous solutions (intrinsic viscosity of approximately 10).

This invention has as an object new and useful compositions comprising synthetic linear polyamides. A further object is the production from this type of polymer of valuable fluid compositions useful in the manufacture of films, fibers, coatings, and the like. A still further object is the preparation of plasticized compositions comprising synthetic linear polyamides. Other objects will appear hereinafter.

The above objects are accomplished by the preparation of liquid and plasticized compositions from alicyclic ketones and the copolyamides such as are obtained by the polymerization with carbon dioxide evolution, of mixtures of two or more N-carboanhydrides of amino acids containing at most one hydrogen on the alpha carbon atom. Preferred for reasons of ease in synthesis of the starting materials are the copolyamides resulting from the N-carboanhydrides of primary alpha-amino acids. The term "alpha-amino acids" is used in accordance with its usual meaning as designating those amino acids having an amino group on the alpha carbon atom. The "alpha carbon atom" refers to the carbon atom of the acid to which the carboxyl group is attached.

In the preferred practice of the invention solutions of these copolyamides are obtained by means of liquid alicyclic ketones boiling below 250° C. These ketones yield compositions which are quite fluid, are easy to handle, and which are of particular utility in making films and fibers. Further the improved fluidity thus obtained, as compared with that obtained by means of hydrocarbon solvents such as benzene, makes possible the production of solutions which have higher solids concentration, e. g., 1 to 15% by volume, for any given copolyamide, but which have the same viscosity as the solution in hydrocarbon solvent.

When plasticized compositions are desired these can be obtained by means of the higher boiling liquid and solid alicyclic ketones, namely, those boiling above 250° C. These ketones when incorporated with the copolyamide in small amounts are softeners or plasticizers for the copolyamide.

The following examples, in which the parts given are by weight, further illustrate the practice of this invention.

Example I

One part of the copolyamide from a 1:1 by weight mixture of the N-carboanhydride of L-leucine and DL-beta-phenylalanine was added to 93.8 parts of cyclohexanone and the mixture allowed to stand at room temperature. A clear, homogeneous solution was formed. A thin layer of the solution was flowed onto a glass plate. Upon evaporation of the cyclohexanone a clear, self-supporting, attractive film was obtained.

The solubility of the copolyamide mentioned in the above example in several different concentrations of cyclohexanone is shown by the following table which summarizes the results.

| Parts by Weight of Copolyamide | Parts by Weight of Cyclohexanone |
|---|---|
| 17 | 83 |
| 10 | 90 |
| 5 | 95 |

In the first of these compositions all the polymer dissolved in the solvent to give a homogeneous, non-flowable composition at room temperature. The remaining two compositions indicated in the table were clear, homogeneous, flowable solutions which gave clear, attractive, self-supporting films upon evaporation of the solvent from a thin layer of the solution flowed on a glass plate. In the best practice of the invention the solutions contain the solvent in amount of from 0.5% to 10% by weight of the copolyamide.

Example II

Ten (10) parts of the copolyamide from a 1:1 by weight mixture of the N-carboanhydrides of L-leucine and DL-beta-phenylalanine were added to 93.8 parts of cyclohexanone and the mixture allowed to stand at room temperature. The few gelled particles remaining were dissolved by slight warming in a water bath at 55° C. Upon cooling, a clear, homogeneous solution was obtained. A thin layer of this solution was flowed onto a glass plate. Upon evaporation of the cyclohexanone at room temperature, a clear, attractive, self-supporting film was obtained which was readily removed from the glass plate by slight soaking in water. In contrast to these results, 10 parts of another sample from the same batch of copolyamide, when dissolved in 87.9 parts of benzene, gave a solution so viscous that it would not flow from an inverted container at room temperature.

Example III

One part of the copolyamide from a 1:1 by weight mixture of the N-carboanhydrides of alpha-aminoisobutyric acid and DL-beta-phenylalanine was added to 93.8 parts of cyclohexanone. The mixture was allowed to stand overnight at room temperature and then warmed for 15 minutes on a steam bath. Upon cooling at room temperature a clear, homogeneous solution was obtained. A thin layer of this solution was flowed onto a glass plate and, upon evaporation of the cyclohexanone, there was obtained a clear, self-supporting, attractive film. The polymer was insoluble in benzene.

Example IV

One part of the copolyamide from a 1:1:1 by weight mixture of the N-carboanhydrides of DL-beta-phenylalanine, 1-aminocyclohexanecarboxylic acid, and alpha-aminoisobutyric acid was added to 188.5 parts of cyclohexanone and the mixture warmed on a steam bath. Upon cooling to room temperature, a clear, homogeneous solution was obtained. A thin layer of this solution was flowed onto a glass plate, and upon evaporation of the cyclohexanone there was obtained a clear, self-supporting, attractive film.

Example V

One part of the copolyamide from a 1:1 by weight mixture of the N-carboanhydrides of L-leucine and DL-beta-phenylalanine was added to 93.9 parts of cyclopentanone. The mixture was allowed to stand at room temperature. A clear, homogeneous solution was obtained. When a thin layer of the solution was flowed onto a glass plate and the cyclopentanone evaporated, there was obtained a clear, self-supporting, attractive film.

Solvents in addition to those mentioned in the examples which are useful in the practice of this invention include the following: alkylcyclohexanones and alkylcyclopentanones, such as 2,3 or 4-methylcyclohexanone, 4-butylcyclohexanone and 2,4-dimethylcyclohexanone, 2 and 3-methylcyclopentanones; alkenylcyclohexanones such as 2-allylcyclohexanone; and cyclobutanone. Chlorinated derivatives of these alicyclic compounds as well as mixtures of the alicyclic ketones may be used. Preferably the alicyclic ketones having 5 to 6 carbons in the ring and the lower aliphatic hydrocarbon radical ring substituents, generally 1-4 carbons and preferably alkyl are employed. The foregoing solvents can, if desired, be used in conjunction with a minor amount of a phenol.

Solutions of the alicyclic ketones of this invention and synthetic linear copolyamides, which solutions generally contain 1-10% of the copolyamide, can be prepared at a given solids concentration in less time if the synthetic linear copolyamide is finely divided and/or the resulting mixture of synthetic linear copolyamide and alicyclic ketone of this invention is heated.

In the plasticized compositions the alicyclic ketone, which as mentioned previously, has a boiling point above 250° C. at atmospheric pressure, is used in amount of from 1% to 50% by weight of the copolyamide. A convenient method for incorporating these higher boiling alicyclic ketones in the synthetic linear copolyamides is to soak the copolyamide in the ketone, or to soak the copolyamide in a solution of the ketone in a solvent for the ketone which is a non-solvent for the copolyamide, and subsequently to dry the impregnated synthetic linear copolyamide.

Examples of suitable alicyclic ketones boiling above 250° at atmospheric pressure, which are useful in the processes previously described for the production of plasticized compositions of synthetic linear copolyamides, include the following compounds: beta-naphthanone, alpha-naphthanone, octyl ester of 2-carboxycyclopentanone, 2,2,4,4,5,6,6-heptachloro - 1,3 - cyclohexanedione, and 2,2,4,4,6,6-hexachloro-1,3,5 - cyclohexanetrione.

The present invention, as has been noted previously, is of particular utility in the manufacture of low viscosity highly fluid compositions comprising the copolyamides described herein and alicyclic ketones boiling below 250° C. This improved fluidity is well shown by the following comparative data: A 2% solution of the copolyamide from a 1:1 by weight mixture of the N-carboanhydrides of l-leucine and DL-beta-phenylalanine dissolved in cyclohexanone exhibited a viscosity of approximately 0.1 poise, as determined in a Gardner-Holdt bubble viscometer (the time of bubble travel was 0.5 second); another sample from the same batch of copolyamide at 3% concentration in cyclohexanone exhibited a viscosity of approximately 0.2 poise by the same method (time of bubble travel, 0.6 second); whereas another sample from the same batch of the same copolyamide, in 2% solution in benzene, exhibited a viscosity of approximately 3.10 poises when measured in the same fashion; and another sample from the same batch of the same copolyamide at 3% concentration in benzene exhibited a viscosity of approximately 110 poises (time of bubble travel, 117 seconds) by the same method.

The present compositions, by reason of their desirable properties referred to herein, find valuable application in the manufacture of films, coatings, and plasticized polymeric compositions.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a solution in a liquid alicyclic ketone of a copolyamide obtained by the condensation polymerization, with carbon dioxide evolution, of a mixture of at least two N-carboanhydrides of alpha-amino acids having no more than one hydrogen on the alpha carbon.

2. A composition of matter comprising a solution in a liquid alicyclic ketone of a copolyamide obtained by the condensation polymerization of a mixture of the N-carboanhydrides of a plurality of aliphatic alpha-monoaminomonocarboxylic acids having no more than one hydrogen on the alpha carbon.

3. A composition according to claim 2 wherein the ketone is cyclohexanone.

4. A composition according to claim 2 wherein the ketone is cyclopentanone.

5. A composition according to claim 2 wherein the ketone is a methylcyclohexanone.

6. A composition according to claim 2 wherein the copolyamide is a leucine copolyamide.

7. A composition according to claim 2 wherein the copolyamide is an alpha-aminoisobutyric acid copolyamide.

8. A composition according to claim 2 wherein the copolyamide is a beta-phenylalanine copolyamide.

9. A composition according to claim 2 wherein the copolyamide is a 1-aminocyclohexanecarboxylic acid copolyamide.

10. A composition according to claim 2 wherein the copolyamide is a beta-phenylalanine/alpha-aminoisobutyric acid copolyamide.

11. A composition according to claim 2 wherein the ketone is cyclohexanone and the copolyamide is a beta-phenylalanine/alpha-aminoisobutyric acid/1-aminocyclohexanecarboxylic acid copolyamide.

12. A composition according to claim 2 wherein the ketone is cyclopentanone and the copolyamide is a leucine/beta-phenylalanine copolyamide.

13. A composition of matter comprising an alicyclic ketone and a copolyamide obtained by the condensation polymerization, with carbon dioxide evolution, of a mixture of the N-carboanhydrides of a plurality of aliphatic alpha-monoaminomonocarboxylic acids having no more than one hydrogen on the alpha carbon, in which composition of matter the alicyclic ketone when boiling below 250° C. constitutes from 83 to 99.5%, by weight, of the composition and when boiling above 250° C. constitutes from 1 to 50%, by weight, of the composition.

CHARLES WILLIAM TULLOCK.

No references cited